United States Patent Office 3,359,040
Patented Dec. 19, 1967

3,359,040
PIPELINING OF SOLIDS
Richard L. Every and Ralph C. Hughes, Ponca City, Okla., assignors to Continental Oil Company, Ponca City, Okla., a corporation of Delaware
No Drawing. Filed Jan. 6, 1966, Ser. No. 532,413
13 Claims. (Cl. 302—14)

This is a continuation-in-part of our application, Ser. No. 362,947, filed Apr. 27, 1964.

The present invention relates broadly to slurry preparation, material handling and in one important aspect this invention relates to an improved method of transporting particulate solid particles in a carrier liquid via pipeline.

At the present time, it is commonly found necessary in industry to move or store substantially large quantities of solids. Not uncommonly these solids are in the form of relatively small grains or particles which, in some circumstances, are moved and handled by methods similar to those employed in moving and handling fluids. Unfortunately, however, when such pulverant materials are thus handled and, more particularly, when they are allowed to stand for relatively short periods of time, it is not uncommon for these materials to compact and thereby become no longer amenable to fluid handling methods. When this occurs, it is necessary to mechanically move and separate such pulverant materials to re-establish their fluid form.

In order to overcome this undesirable aspect of pulverant material handling, various schemes have been attempted. For instance, it has been suggested that constant agitation can be utilized to maintain such materials in a fluid condition. This, of course, requires a constant output of energy with attendant costs which, on occasion, render the economic feasibility of material handling marginal or non-existent. In addition, it has been suggested that certain pulverant materials may be slurried with a liquid to overcome the problems characteristic of dry material handling. Unfortunately, however, this has not always proved to be a satisfactory solution to problems of compaction, and, in addition, it has been found that subsequent separation of the liquid from the solid is not always easy to accomplish. Moreover, it is not uncommon that certain portions of the liquid are lost by adsorption on the surfaces of the solids. When water or other similar inexpensive materials are utilized to slurry solid pulverant materials, this loss of material is, of course, no particular economic drawback. On the other hand, when certain other fluids, such as hydrocarbons and the like are utilized as the carrier liquid in a slurry, loss of these materials through adsorption on the solids constitutes a major obstacle to economic practice of the slurrying technique. Consequently, in spite of numerous attempts which have been made to handle pulverant material quickly, easily and without undue economic loss, a method for handling such materials without objectionable compaction and further without objectionable loss of a carrier material has, until the present invention, remained an elusive desideratum.

Some of the methods proposed by the prior art include forming an emulsion and incorporating the solids in the emulsion prior to introducing the particles into the carrier fluid, see for example U.S. Patents 2,042,425 and 2,128,913. There are two particular disadvantages to this method, first being that the emulsifying agent is introduced as a contaminant and secondly this necessitates breaking the emulsion in addition to the cost of equipment and emulsifier. Another method has been proposed to transport the particles in water by first wetting the particles with a hydrocarbon. See U.S. 2,686,085 and German Patent 939,018 wherein coal is so transported.

In our earlier filed application, we taught that wetting of solid particles which were nonreactive with or soluble in the carrier fluid with a second fluid, also nonreactive with a solute for the particles and nonmiscible with the carrier fluids would aid in transporting all such solid particles. Subsequent to the filing of the earlier case, we have found that while this is still true, e.g., coal wetted with a hydrocarbon to be transported in water, that a number of difficulties are encountered when the flow of fluid stops or drops into the laminar flow range, particularly below 3000 Reynolds number. Under such conditions, the lighter hydrocarbon, being less polar than water and having less surface tension will float away from the coal or solid particle. If, due to power failure or other cause, the pipeline flow ceases, the particles so treated settle out and compact. It is then extremely difficult, if not impossible, to reform the slurry in the absence of mechanical reaming or the like. Also, slurries prepared by prewetting with a hydrocarbon prior to slurrying in water, when allowed to settle, the solids tend to compact and the hydrocarbon comes to the surface.

It is therefore an object of the present invention to provide an economic method of handling pulverant materials.

It is a further object of the present invention to provide a method for slurrying pulverant materials with a liquid for providing a noncompacting slurry.

Another object of the present invention is to provide a method for transporting pulverant materials in a slurry which makes possible the later separation of the pulverant material from the liquid phase of the slurry without substantial loss of the carrier liquid phase.

An additional object of the present invention is to provide a method for forming an easily separable, noncompacting slurry of pulverant material in a liquid.

Still another object of the present invention is to provide a method for safely, economically and easily handling coke.

Yet another object of the present invention is to provide a method for forming a coke-hydrocarbon slurry which may be separated without loss of the hydrocarbon.

Still another object of the present invention is to provide a slurry for coke which is noncompacting and which may be easily separated without loss of constituents forming the slurry.

In one aspect of the present invention, a solid pulverant material is first mixed with water which is adsorbed on the surface of the solid. The solid with the adsorbed water is then mixed with a hydrocarbon carrier liquid to form a slurry which can then be stored for an indefinite period without objectionable compaction or which can be pumped through a pipeline without objectionable compaction within the pipeline.

Although we do not wish to be bound by any theory, it is believed that the present invention offers advantages over the prior art methods due to the high surface tension of water plus the polar nature of water. Contrary to the prior art teaching that the emulsion and/or hydrocarbon treatments improve buoyancy, the water is generally heavier than the carrier hydrocarbon. If desired, a wetting agent can be used to improve the wetting of the solid.

A wide variety of materials may be handled according to the teachings of the present invention. In general, it is only necessary that such materials be relatively finely divided. As such these materials may be of uniform size or may have a fairly wide size distribution, and may be of uniform shape or may be clastic. The size and shape, aside from certain limits hereinafter set forth, are without effect in practicing the present invention. Examples of materials which can be handled by the techniques taught herein are coal; naturally occurring ores, such as potash, phosphate rock, cryolite, bauxite, etc.; coke, either petroleum or charred coal; and pelletized plastics, such as polystyrene polyethylene, etc. Under present economic conditions, coke is especially suitable for handling according to the present invention since it is porous and thus provides a large surface area for a given bulk.

Before these and other solid materials can be utilized with the present invention, they should, where necessary, be reduced in size to particles not more than about one-half inch in diameter. While the one-half inch limitation is by no means critical, it will, as a practical matter, be found that equipment difficulty will be encountered in attempting to pump solids having greater particle size. Where possible, it will be found advantageous to limit particle size to about one-fourth inch. On the other hand, there is no known limitation in utilizing the present invention with particles of much smaller size. Depending upon the type of apparatus which is utilized to separate the slurry, particles as small as one micron or smaller may be handled with facility by means of the present invention.

After the particular type of solid material has been chosen, it is then mixed with an effective amount of water.

As was stated earlier, the solid material is mixed with "an effective amount" of water. In general, the most effective amount of water is that amount which is necessary to substantially completely saturate the solid material. However, some improved results will be achieved by using less than enough water to completely saturate the solid material. In general, an amount of water equivalent to at least about 50% by weight of the total amount necessary to saturate the solid material should be used, and it is preferred to use at least about 90%. A small excess can be used without deleterious effect. Preferably, we use 90 to 105% of the water necessary to completely wet the solid.

As in the case of the choice of solid materials, a wide selection of carrier liquid is available, depending upon the system utilized. In general, any hydrocarbon is technically suitable which is nonreactive with the solid and is liquid and pumpable under the conditions of transportation. Within this framework the choice of carrier liquid will be determined by the character of the water and the associated solid material. For instance, any normally liquid hydrocarbon, including crude oil and those normally liquid hydrocarbons such as wash oil, kerosene, diesel, gasoline, bunker oil, isopentane, hexane, heptane, and similar paraffins, benzene, toluene, xylene and derivatives of such aromatics, may, under certain circumstances, be suitable for use as a carrier liquid.

The slurry which is formed in practicing this invention may be formed utilizing a wide range of solids concentrations. It has been found that up to about 95% by weight of solid material and water can be utilized when proper pumping facilities are available; however, in order to reduce the energy requirements of pumping, it will ordinarily be preferred to utilize a solid-water concentration of from about 30% to about 60% by weight of the total slurry. Moreover, it has been found that an optimum concentration for a coke-water-kerosene system is about 50% by weight coke and water.

As was stated earlier, in practicing this invention, the solid material is first mixed with the water. The mixing may be accomplished by any means well known in the art, and commonly will consist of the steps of adding the solid material to an excess amount of the water and thereafter agitating the mixture until the solid material is completely coated with the water. In general, it is possible to determine beforehand the amount of water which is necessary for a particular type and particle size range of solid material. However, such predetermination is not necessary. Instead, the solid material may be added to an excess of the water, and after agitation to saturate the solid material, the mixture may be separated by simple gravity means, such as by straining or by opening a drain in the bottom of a container in which the mixture is held. It has been found that a slight excess, not exceeding about 5% of water is not harmful to the method. If desired, vacuum filtration may be utilized to separate the excess water from the solid material, although it is not necessary to utilize sophisticated methods of this type.

Once the solid material is mixed with the water, it may then be combined with the carrier liquid to form a slurry, by several means well known in the art. Commonly, the slurry will be pumped into a pipeline in which is located the carrier liquid. By varying relative pump rates between the carrier material and the slurry, a slurry of any consistency may be achieved. Additionally, a batch-type process may be carried out wherein the solid material is added to the carrier fluid in a tank with accompanying agitation. The resulting slurry may then be removed to the pipeline or may be left within the tank until such time as it is to be utilized or transported.

In general, the solid to be carried in a pipeline is transported many hundreds of miles. To prevent overrunning of carrier fluid and slurry, the flow conditions should be maintained in turbulent flow. While Reynolds numbers of 3000 or more are generally operable, we prefer a Reynolds number of at least 20,000. Should the flow be interrupted for any reason, the pipeline is preferably shut down completely. Upon restoring flow, it is preferred that the pumps be started against a head and the flow be started rather abruptly. However, as will be seen later, once turbulent flow is restored, the interface between slurry and non-slurry carrier fluid will correct itself, and the interface will be fairly well defined.

Just as the formation of the slurry is a relatively simple matter which may be accomplished without difficulty by those skilled in the art, so also is the separation of the slurry a simple matter which can be achieved by techniques and apparatus commonly utilized for separation purposes. It has been found, for instance, that a hydrocyclone is quite suitable for removing the solid particles from the carrier liquid. Commonly, when a hydrocyclone is used for this purpose, it will be found desirable to make a plurality of passes through the hydrocyclone, the number of passes depending upon the desired purity of the separated products. Moreover, simple filtration, such as filtration through a plurality of excelsior mats may be utilized to remove relatively small particles from the carrier liquid passing from the hydrocyclone. In general, the particles which must be removed by filtration will be less than about five microns in size.

The above is not intended to suggest that a hydrocyclone combined with a mechanical filter is the only type of suitable separation scheme. There are any number of such schemes, such as flotation, gel precipitation, filtration and the like which can be practiced by those skilled in the art, and no criticality is attached to the method of such separation.

After the components of the slurry have thus been separated, it will often be found desirable to remove the water from the solid material. Here again, depending upon the particular type of solid material which is to be separated, the techniques for such separation may vary widely. Most commonly, it will be found advantageous to heat the solid material in order to vaporize and drive off the water adsorbed thereon. Thus, in the case of water and coke, it is merely necessary to heat the coke to about 150° C. in order to completely dry the coke, and return it to its original condition. It is, of course, possible that it will not be desired to make the solid-water separation by heating, due to any one of several possible reasons, such as, for instance, possible thermal degradation of the solid material. Under these circumstances, it may then be necessary to use a selective solvent, the choice of which, of course, will depend upon the particular materials being treated or, as another technique, pressure reduction for vaporization of the water may be practiced. In any event, separation of the solid material from the water will not always be necessary and, when such separation is necessary, the precise method for accomplishing it will be a mere matter of choice for those skilled in the art.

In one preferred aspect of the present invention, a slurry is formed comprising coke, water, and a normally liquid hydrocarbon, preferably gasoline, kerosene, or diesel oil. In the coke-water-hydrocarbon system, it is preferred to utilize from about 40% to about 60% by weight of the water-loaded coke in the slurry. In addition, when mixing the coke with water prior to forming the slurry, it is preferred to use water at a temperature above about 140° F. and preferably water in the form of steam is utilized to saturate the coke. This insures the water vapor penetrating the pores of the coke.

In the above discussion of the invention thus far, a large number of materials have been suggested for each of two of the main components forming a portion of this invention. These materials may be combined in a substantial number of different combinations. Certain of these combinations are listed hereinafter in Table I. It is to be undesrstood, of course, that the combinations of material listed in Table I are but for purposes of illustration and are in no sense limited insofar as the number and type of choices which can be made in practicing the present invention.

TABLE I

| Pulverant Material | Wetting Agent | Carrier Liquid |
| --- | --- | --- |
| Coke | Water | Diesel. |
| Coal | do | Bunker oil. |
| Polyethylene chips | do | Toluene. |
| Potash | do | Regular gasoline. |
| Cryolite | do | Kerosene. |
| Polystyrene | do | Xylene. |
| Coke | do | Regular gasoline. |
| Potash | do | Crude oil. |
| Do | Brine | Diesel. |
| Phosphate | Water | Do. |

In order to further illustrate certain aspects of the present invention, the following examples are presented:

*Example 1*

Petroleum coke (40 ml.) was placed in a burette and covered with sufficient kerosene to fill the burette to 100 ml. and the mass agitated by hand. The burette was then set down and in about ten minutes the coke had compacted to about 40 ml. After 24 hours, vigorous hand shaking failed to reestablish the slurry.

Petroleum coke was wetted with kerosene and 40 ml. placed in a second burette and the burette filled to the 100 ml. mark with water and shaken as above. Again, after about 10 to 15 minutes, the coke had settled to the 40 ml. mark and a layer of kerosene had separated out on top of the water. Again, after 24 hours, it was not possible to completely reestablish the suspension.

In a third burette, 40 ml. of water-wet coke was placed in a burette and the burette filled with kerosene. After several weeks the coke had settled to about the 60 ml. mark, and merely turning the burette caused the suspension to be reestablished.

*Example 2*

Prior to conducting the experiment leading to the results presented in this example, the necessary equipment was assembled. This equipment comprised an open topped reservoir of approximately 30 gallons having an inlet and an outlet. The ends of a ¾ inch pipe loop approximately 30 feet long were then connected to the inlet and to the outlet of the reservoir. Approximately 5 feet from the reservoir outlet and communicating with the interior of the pipe loop was located a variable speed centrifugal pump which functioned to pass fluid through the pipe loop and reservoir. A length of transparent tubing was placed in the pipe at a position approximately half-way from the inlet and outlet to allow observation of flow conditions within the pipe.

Prior to the first set of experiments, the pipe and reservoir system was filled with kerosene.

Initially, coke without the water was slowly added to the reservoir while agitating the kerosene within the reservoir to create a coke suspension therein. After an approximately 35% by weight coke-kerosene mixture was formed, the pump was actuated and turbulent flow along the line was observed. During initial flow, no problems were attendant to the flow of the coke-kerosene slurry. In order to simulate shutdown, the centrifugal pump was deactivated and the system was allowed to stand for approximately 15 hours. At the end of this time, it was observed in the clear section of pipe that the coke had settled to the bottom and that a relatively clear kerosene phase was stratified above the coke. Attempts to return the system to flow conditions were not successful inasmuch as relatively large portions of the compacted coke were torn away from the situs of their formation and tended to plug the pipe in a number of places. It was found necessary to initiate flow under laminar conditions, and it was further found necessary to utilize pure kerosene rather than the kerosene-coke slurry in the initial stages of start-up of the system. Moreover, the compacted coke did not readily become re-suspended but rather tended to remain on the bottom in a compacted state even after the circulation of pure kerosene was begun.

An attempt to use a 40% coke concentration in kerosene ended in complete failure with the line completely plugged.

The kerosene-coke slurry was then separated in a hydrocyclone, and the relatively dry coke was heated to drive off the adsorbed kerosene. It was observed that approximately 12% of the kerosene utilized in the system was lost due to adsorption on the coke, and it was also observed that temperatures of about 500° C. were necessary to remove kerosene from the coke.

A quantity of coke was then thoroughly mixed with an excess amount of plain tap water, and the excess water was allowed to drain off the coke. The water-loaded coke was then slowly mixed with fresh kerosene in the reservoir. As in the case of the untreated coke, this mixture was constantly agitated during the addition of the water-loaded coke. The resulting slurry was approximately 50% by weight coke and water.

This mixture was then pumped around the test loop under turbulent flow conditions, and no difficulty was experienced in handling the coke-water-kerosene system. Subsequently, the centrifugal pump was deactivated and the system allowed to stand for approximately 15 hours. At the end of this time no compaction was observed, and, upon reactivation of the pump, the slurry was immediately moved through the system without plugging. It was not necessary to utilize pure kerosene in re-establishing flow, nor was it necessary to gradually increase the speed of the pump during this process.

A portion of the slurry was removed from the system and was separated in a hydrocyclone. The water-wet coke was then heated to approximately 150° C. in order to remove the adsorbed water whereupon it was observed that approximately 1.5% of the kerosene was lost during this procedure.

*Example 3*

Approximately 120 grams of coke, the particles of which ranged in size from about 5 to about 590 microns were immersed in a container filled with water. After agitation, the excess water was allowed to drain from the coke by gravity, and the now water-wet coke was added to a sufficient amount of regular gasoline to form a 30% by weight coke-gasoline slurry. This slurry was placed in a beaker and allowed to remain quiescent for approximately 12 hours. At the end of this period of time, it was observed that no compaction of the coke had taken place.

While some coke settling was observed, it was possible to resuspend the coke in the gasoline merely by reversing the down position of the beaker.

For purposes of comparison, approximately 120 grams of coke of the same type utilized in the experiment discussed immediately above were added directly to gasoline to form a coke-gasoline slurry. This slurry comprised approximately 30% by weight coke. After mixing of the slurry, it was placed in a beaker and allowed to stand quiescent for approximately 12 hours. At the end of this period of time, it was noted that substantial compaction of the coke had taken place at the bottom of the gasoline phase, and it was further noted that reversing the down position of the beaker did not re-suspend the coke within the gasoline. Instead, prolonged vigorous shaking of the beaker was found to be necessary to attain the desired re-suspension.

The water-wet coke was filtered from the gasoline and was heated to a temperature of approximately 150° C. to drive off the water. Similarly, the untreated coke was filtered from the gasoline and was then heated to drive off the gasoline. It was observed that no gasoline losses were incurred in the case of the water-wet coke, while approximately 12% of the gasoline initially utilized was lost during the drying process in the case of the untreated coke. Moreover, it was necessary to heat the untreated coke to a temperature of approximately 500° C. in order to completely remove the gasoline.

*Example 4*

A two-mile loop of the two-inch pipe equipped with a single-stage United Pump (4"-STC8-B), a centrifugal pump driven by a 40-HP motor and having a 4-speed transmission drive, was used to evaluate the effectiveness of pumping water-wet solids. A short distance of the two-mile loop had a glass section installed for observing the moving liquid. Diesel fuel was utilized as the carrier fluid.

A 580-foot batch of slurry containing 56% water-wet solid petroleum coke by weight was injected into the test loop and circulated ten times for a total of 20 miles. The pipeline temperature during the test varied from 29.5° F. to 57° F. The pump discharge pressure was held constant at 125 p.s.i.g. throughout the test. The flow velocity, consequently, varied slightly with temperature ranging from 3.3 feet per second at the lowest temperature to 3.5 feet per second at the highest temperature. At the end of the fourth and sixth passes, the test loop was shutdown and then restarted after periods of 3 and 10 hours, respectively.

On each pass, the slurry-diesel interface was observed through the glass section and was also recorded on each pass through a full-stream gravitometer. The gravitometer is essentially a single loop of the same pipe used in the 2-mile loop. This loop is connected to the test circuit by swivel joints and supported on a drum floating in a water-bath. The floating drum is connected to the lever mechanism of a scale which converts any vertical motion of the floating loop into horizontal movement by a recording pen impinging on a continuously moving strip chart. Thus, any change in specific gravity of the flowing fluid can be recorded without adding to or subtracting from the mixing of products in the pipe line itself.

At both ends of the slurry batch, definite interfaces were already established after the first pass (2 miles). It was observed that the density gradient of the trailing interface was much steeper than that of the leading interface. The length of both interfaces was somewhat longer than expected, which was probably due to dilution and settling of particles in the 4-inch suction manifold at the beginning and end of slurry injection. The density of the slurry batch was slightly lower than normal.

At the end of the second pass (4 miles) very little change was observed in the leading interface which maintained the same density gradient. The density of the main slurry batch was normal while its total length was slightly decreased. This decrease was due to changes at the tail end of the slurry batch where the density of the slurry was slightly above normal, while the density gradient had practically disappeared leaving a sharp cut-off between slurry batch and trailing interface which was clearly observed at the sight glasses. The trailing interface was slightly longer but less concentrated than the head interface. Samples taken behind the trailing interface contained only traces of solid particles including coke, sand and line scale.

No significant changes were observed during the third and fourth passes. The shape and length of the interfaces and of the slurry batch was maintained; this would indicate that stable interface conditions had been reached within 2 passes (4 miles). The test loop was shutdown after the fourth pass was completed. Three hours later the line was restarted for the fifth pass. After 2 miles, the shape of the two interfaces was similar to that of the first pass, and the density of the slurry batch was slightly below normal.

At the beginning of the sixth pass, a pig (2" neoprene ball) was dropped into the trailing interface behind the slurry batch. At the end of the sixth pass, the density of the slurry batch was normal. The shape of the interfaces was similar to that during the second to fourth passes, the leading interface having a gradually sloping density gradient while that of the trailing interface was very steep. The total length of the slurry batch again had slightly decreased with the eroded material all going into the trailing interface. However, the pig in the interface kept most of this material from spreading, and was actually accumulating or sweeping solid particles ahead of it. After the sixth pass was completed, another pig was dropped into the trailing interface, and the test loop was shutdown overnight.

The seventh pass was started after 10 hours. Halfway around the loop it was observed that a small amount of diesel was overrunning the slurry which appeared not to be in fully turbulent flow. At the end of the pass the slurry batch was strung out, and its density was lower than normal. Both interfaces showed density gradients—the density gradient of the leading interface being normal and shorter than that of the trailing interface—indicating a shift in the slurry batch.

As expected, a rearrangement of the trailing interface occurred during the eighth pass at the end of which the density gradient was eroded, the trailing interface was sharp, the slurry density normal, the total batch was shorter, but had resumed its stable configuration. This was confirmed by the ninth and tenth passes which showed no appreciable change from the eighth pass. At the completion of 10 passes, 440 feet of slurry batch was cut out of the test loop and returned to the agitation tank. The concentration of the reclaimed slurry was 52% by weight.

*Example 5*

Using the equipment of Example 4, several runs were made to determine pump efficiency. A standard watt-hour meter was used to determine power consumption during test runs, and the differential pressure developed by the pump was measured by standard bourdon-tube type gages installed adjacent the suction and discharge flanges of the unit. Flow rates were obtained by using a slightly revised Rockwell 4" Eureka-B vane-type meter. A No. 793-A Rockwell 1" vane meter had proven satisfactory in obtaining the hydraulic data, but this model was not available in the flow ranges expected on the pump testing. Flow rates were varied by adjusting a butterfly-valve on the discharge side of the pump. Test data used are compiled in Table II.

A run was made at various flow rates on clear diesel to establish a base curve for comparison of slurry runs. The unit had been equipped with a flushing system to protect the wear-rings and mechanical-seal face: product (or slurry) was to be drawn in small amounts from the discharge, passed through a hydrocyclone to separate the solids and the liquids—the heavies (or solids) routed back to the suction of the pump, and the effluent used to flush the wear-rings and seal through taps drilled for this purpose. The use of this system made no noticeable difference in the performance of the unit on clear diesel; however, the hydrocyclone plugged in slurry service, and the system was abandoned. All test results, therefore, compare performances of an "unprotected" centrifugal pump.

Water-wet petroleum coke was gradually added to the clear diesel being circulated from a 100-bbl. tank equipped with a top-mounted agitator and test curves run at solids concentrations (by weight) of 43% (sp. gr. 1.003), 48% (sp. gr. 1.023) and 52% (sp. gr. 1.037). After more than 41 hours of slurry service, a switch was made to clear diesel and another test conducted to check the effects of intermittent slurry service. The procedure was then repeated on clear diesel and a 56% (sp. gr. 1.060) slurry.

From the curves, the relative pump-efficiency on slurry (slurry eff. percent/diesel eff. percent) ranged from 86.5% at 300 g.p.m. to 87.5% at 400 g.p.m. on 43% solids slurry; and from 95.9% to 94.7% on a 52% slurry at the same rates respectively. As was expected, the optimum slurry "hydraulically" gave the best performance judged on the efficiency criteria. Based on these data, an efficiency reduction of approximately 7% of the "rated" efficiency of a centrifugal pump could be used for design and operating-cost estimates.

Head-capacity curves ranged from 90.9%, on 40% slurry, to 96% of diesel performance with a 52% slurry at 400 g.p.m. Greater accuracy in the measuring devices would give more uniform results; however, the drop in head developed corresponds fairly well to the over-all efficiency comparisons.

Since a certified motor-performance curve was not available, an assumed motor efficiency factor of 90% was applied to all the gross watt-hours consumed during a test run. The work performed (b.p.h.×p.s.i.×0.000304) in kw. was divided by 0.9×kw. consumed (from watt-hour meter) to obtain the pump efficiency at each flow-rate. Flow rates were taken by timing a displacement of 10 barrels through the 4″ meter.

After the initial series of tests, the pump was dismantled and reworked. The major repairs consisted of replacing the wear-rings that had been tapped and grooved for the abandoned "flushing" system with standard wear-rings. Wear-ring clearances were reduced from 0.019″ to 0.012″. This reduced clearance may exclude the larger particles and in turn reduce the wear. Another base curve was run on clear diesel followed by test run on 56% slurry. Relative pump efficiency was noticeably lower with 56% slurry than either 40% or 52% concentrations. This effect was anticipated in view of relatively small change in apparent viscosity (developed in the hydraulic study) between 40% and 52% slurries compared to a rapid increase in apparent viscosity between 52% and 56% concentrations.

Higher wear-rate activities can be anticipated in runs made at concentrations lower than 52%. Since the same test unit was used to circulate all the slurry in building up to the 52% concentration, the extrapolation of the observed wear-rates to a system operating on a controlled optimum concentration should be optimistic.

The results are tabulated in the table.

TABLE II.—TEST DATA

| Product | Date | Through-put | | Pressures | | | Diff., ft. of head | Kw. Work | Kw. Input | Input, 90% | Efficiency | |
|---|---|---|---|---|---|---|---|---|---|---|---|---|
| | | B.p.h. | G.p.m. | Suct. | Disch. | D.P. | | | | | Percent Total | Percent/Diesel Percent at 400 g.p.m. |
| 1. Diesel (.84) | 1/8/65 | 585 | 410 | 4″ v | 60# | 62# | 170.5 | 11 | 21.85 | 19.7 | 55.9 | 100 |
| | | 568 | 398 | 3.5″ v | 61.2# | 62.9# | 172.5 | 10.8 | 21.3 | 19.2 | 56.3 | |
| | | 435 | 304 | 0.5″ v | 62.0# | 62.2# | 171.0 | 8.23 | 18.75 | 16.9 | 48.6 | |
| | | 248 | 174 | 1.2# | 63.0# | 61.8# | 170.0 | 4.65 | 15.4 | 13.85 | 33.6 | |
| | | 0 | | 2.6# | 62.5# | 59.9# | 165.5 | | | | | |
| 2. Diesel (after slurry). | 2/18/65 | 554 | 388 | 2″ v | 60# | 61# | 167.5 | 10.3 | 20.9 | 18.9 | 54.5 | 55/56=98.2. |
| | | 517 | 362 | 0.5″ v | 60.6# | 60.9# | 167.0 | 9.56 | 20.3 | 18.25 | 52.4 | |
| | | 443 | 310 | 0.5# | 61.4# | 60.9# | 167.0 | 8.2 | 18.85 | 16.95 | 48.4 | |
| | | | | 3.2# | 69.0# | 59.8# | 165.0 | | | | | |
| 3. Slurry 43%. Sp. Gr. 1.003. | 2/12/65 | 630 | 440 | 4″ v | 67.5# | 69.5# | 160.0 | 13.3 | 28.4 | 25.6 | 52.0 | 49/56=87.5. |
| | | 614 | 430 | 3″ v | 68.0# | 69.5# | 160.0 | 12.95 | 27.9 | 25.1 | 51.6 | |
| | | 540 | 378 | 1″ v | 69.0# | 69.5# | 160.0 | 11.4 | 26.6 | 23.9 | 47.7 | |
| | | 405 | 284 | .75# | 71.0# | 70.2# | 162.0 | 8.64 | 23.8 | 21.4 | 40.4 | |
| | | | | 3.75# | 68.0# | 64.3# | 148.0 | | | | | |
| 4. Slurry 48%. Sp. Gr. 1.023. | 2/16/65 | 650 | 455 | 5″ v | 69# | 71.5# | 161.0 | 14.1 | 28.8 | 25.9 | 54.5 | 51.8/56=92.5. |
| | | 572 | 400 | 3″ v | 71# | 72.5# | 163.0 | 12.6 | 27.0 | 24.35 | 51.8 | |
| | | 465 | 326 | 1.5″ v | 73# | 73.7# | 166.0 | 10.4 | 24.75 | 22.25 | 46.8 | |
| | | | | 4# | 73# | 69.0# | 156.0 | | | | | |
| 5. Slurry 52%. Sp. Gr. 1.037. | 2/17/65 | 640 | 448 | 5″ v | 70# | 72.5# | 161.5 | 14.1 | 28.5 | 25.6 | 55 | 53/56=94.7. |
| | | 571 | 400 | 2″ v | 72# | 73# | 162.5 | 12.7 | 26.6 | 24.0 | 53 | |
| | | 485 | 340 | 1.5″ v | 74# | 74.7# | 166.5 | 11.0 | 24.7 | 22.2 | 49.6 | |
| | | | | 4.5# | 73# | 68.5# | 153.0 | | | | | |
| 6. Diesel (Reworked pump). | 3/15/65 | 578 | 405 | 3.6″ v | 61.3# | 63.1# | 173.5 | 11.1 | 21.4 | 19.2 | 57.8 | 100% (new). |
| | | 524 | 366 | 2.2″ v | 62.0 | 63.1# | 173.5 | 10.05 | 20.5 | 18.45 | 54.5 | |
| | | 527 | 369 | 2.1″ v | 62.0 | 63.1# | 173.5 | 10.1 | 20.5 | 18.45 | 54.8 | |
| | | 494 | 346 | 1.6″ v | 62.4 | 63.2 | 174.0 | 9.46 | 19.85 | 17.85 | 53.0 | |
| | | 452 | 316 | 0.5″ v | 62.9 | 63.2 | 174.0 | 8.66 | 19.1 | 17.2 | 50.4 | |
| | | | | 2.5# | 65.2 | 62.7 | 172.5 | | | | | |
| | | 571 | 400 | 3.7″ v | 61.3# | 63.1# | 173.5 | 10.95 | 21.3 | 19.15 | 57.2 | |
| 7. Slurry 56%. Sp. Gr. 1.06. | 3/15/65 | 670 | 470 | 7.5″ v | 69.7# | 73.4# | 160.0 | 14.9 | 35.5 | 31.9 | 46.7 | (Out). |
| | | 590 | 413 | 4.9″ v | 71.9# | 73.4# | 160.0 | 13.15 | 34.0 | 30.5 | 43.1 | |
| | | 449 | 314 | 0.0 | 74.5 | 74.5 | 162.5 | 10.15 | 31.1 | 28.0 | 36.2 | |
| | | 374 | 262 | 0.9# | 75.1# | 74.2 | 162.0 | 8.43 | 29.5 | 26.5 | 31.9 | |
| | | 667 | 466 | 7.8″ v | 68.8# | 72.7 | 159.0 | 14.75 | 41.0 | 36.9 | 40.0 | |

Sample calculations:
52% Slurry=400 g.p.m.
Work Performed=B.p.h.×p.s.i.×0.000304.
Kw.=571×73×0.000304=12.7 kw.
Work Input=Motor eff.×kw. input (watt-hour reading).
=.9 (assumed)×26.6 kw.=24.0 kw.
Pump Eff.=Output/input=12.7/24.0=53%.
Relative Eff.=Slurry eff./Diesel eff.=53/56=94.7%.

Having thus described the invention by providing specific examples thereof, it is to be understood that no undue limitations or restrictions are to be drawn by reason thereof and that many variations and modifications are within the scope of the invention.

We claim:

1. A method for transporting particulate solids selected from the group consisting of coke and phosphate rock through a pipeline with a hydrocarbon carrier liquid which comprises the steps of:
   (a) wetting said solids solely with water;
   (b) mixing the water-wet solids with said carrier liquid to form a slurry; and
   (c) moving said slurry through said pipeline.

2. The method defined in claim 1 wherein said solids are removed from said pipeline at a point remote from point of introduction.

3. The method defined in claim 2 wherein said slurry comprises not more than about 95% by weight of water and solids.

4. The method defined in claim 3 wherein said slurry comprises from about 30% to about 60% by weight of water and solids.

5. The method defined in claim 4 wherein said carrier liquid comprises a normally liquid hydrocarbon.

6. The method defined in claim 5 wherein said solid comprises coke.

7. The method defined in claim 6 further characterized in that said normally liquid hydrocarbon is chosen from a group comprising gasoline, diesel oil and kerosene.

8. The method defined in claim 7 wherein said coke is substantially saturated with said water.

9. A slurry comprising:
   (a) pulverant material selected from the group consisting of coke and phosphate rock which is substantially saturated solely with water and said water wet pulverant material being suspended in
   (b) a liquid hydrocarbon.

10. The slurry defined in claim 9 wherein said pulverant material is coke.

11. The slurry defined in claim 10 wherein said hydrocarbon is chosen from the group consisting of gasoline, diesel oil and kerosene.

12. A method for handling coke which comprises the steps of:
   (a) mixing said coke with an excess of water to form water-wet coke;
   (b) removing the excess water from said coke;
   (c) mixing said water-wet coke with a normally liquid hydrocarbon to form a slurry;
   (d) passing said slurry through a pipeline;
   (e) separating said water-wet coke from said normally liquid hydrocarbon; and
   (f) heating said coke to about 150° C. to drive off said water.

13. The method defined in claim 12 wherein the water used in practicing step (a) is at a temperature above about 140° F.

References Cited

UNITED STATES PATENTS

| | | | |
|---|---|---|---|
| 1,390,230 | 9/1921 | Bates | 302—66 |
| 2,162,200 | 6/1939 | Kiesskalt et al. | 44—51 |
| 2,686,085 | 8/1954 | Odell | 302—66 |

FOREIGN PATENTS

| | | |
|---|---|---|
| 939,018 | 2/1956 | Germany. |
| 711,105 | 6/1954 | Great Britain. |

ANDRES H. NIELSEN, *Primary Examiner.*